G. E. HAZLETT.
MOTOR VEHICLE.
APPLICATION FILED MAY 9, 1918.
1,331,197.
Patented Feb. 17, 1920.
2 SHEETS—SHEET 1.
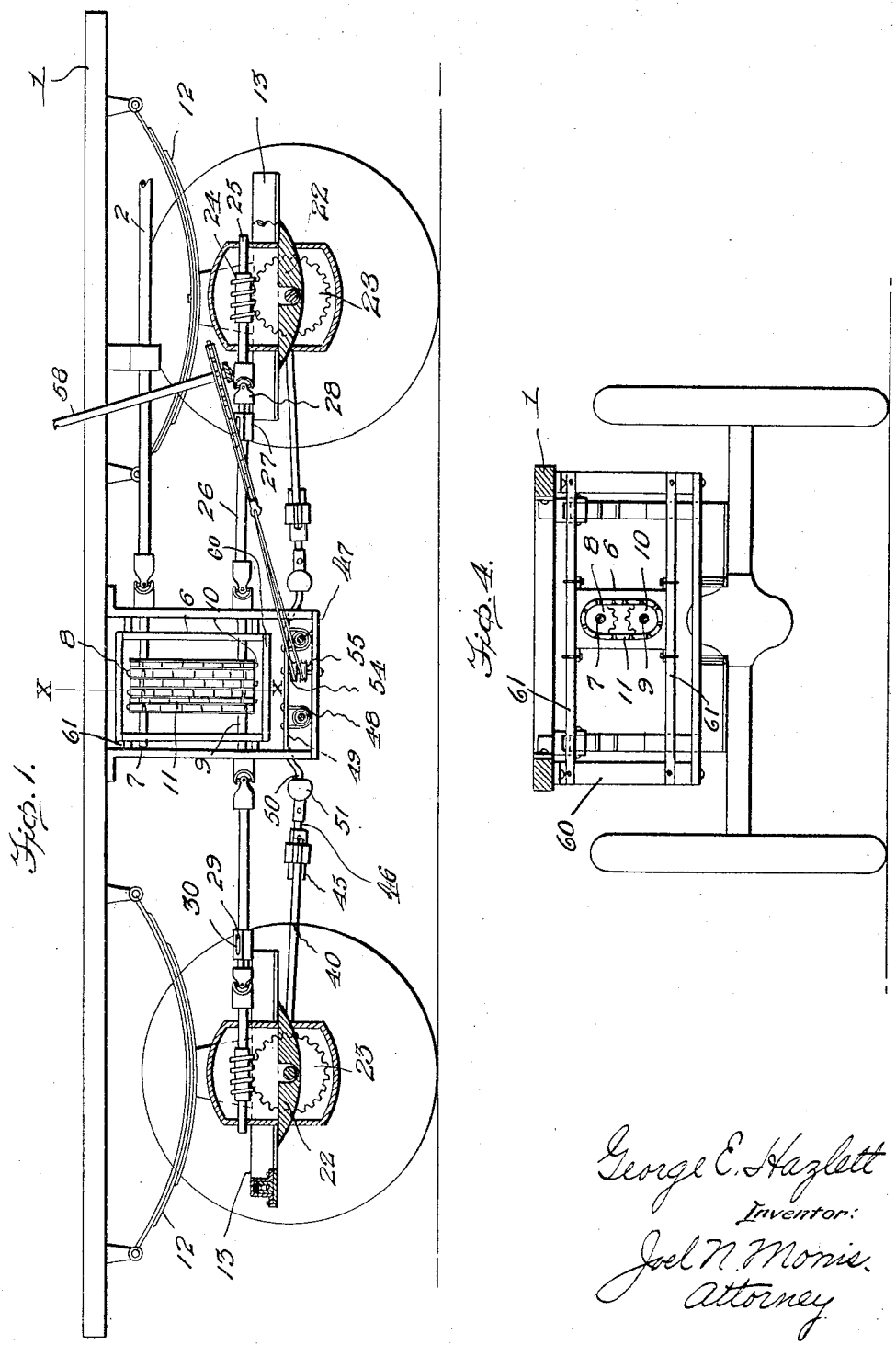
George E. Hazlett
Inventor:
Joel N. Morris.
Attorney G. E. HAZLETT.
MOTOR VEHICLE.
APPLICATION FILED MAY 9, 1918.
1,331,197.
Patented Feb. 17, 1920.
2 SHEETS—SHEET 2.
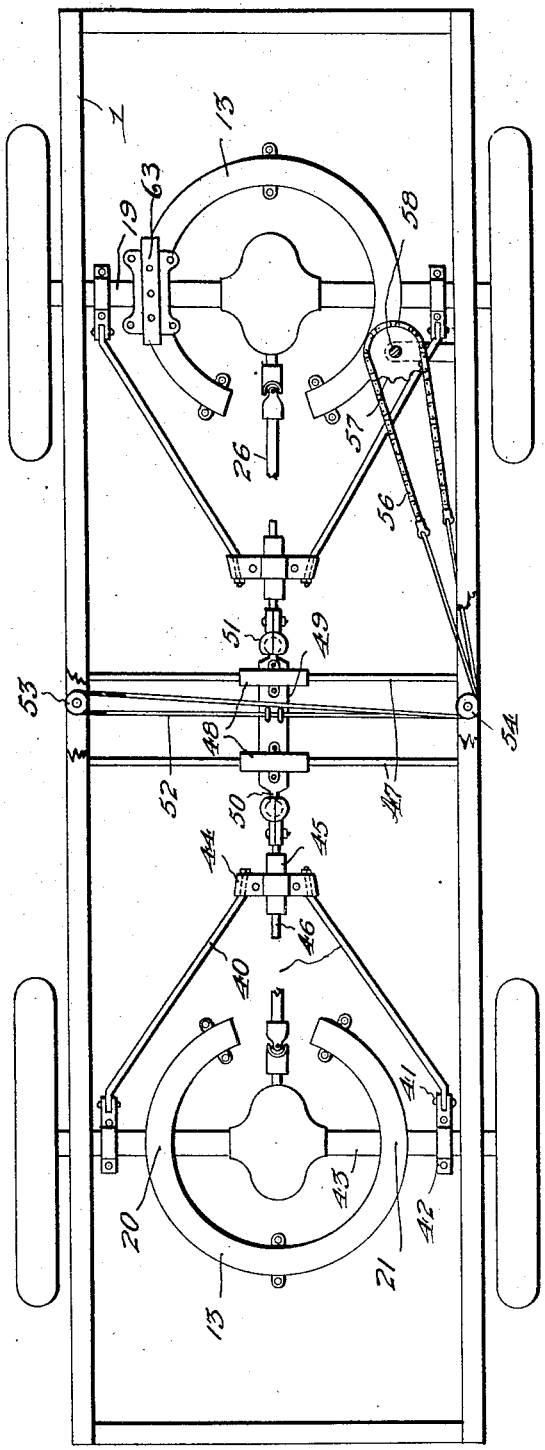
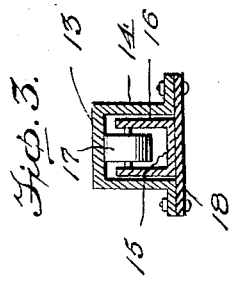
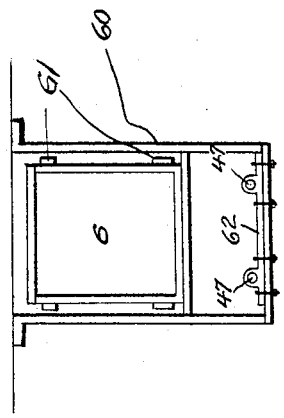
George E. Hazlett
Inventor;
Joel N. Morris,
Attorney

UNITED STATES PATENT OFFICE.

GEORGE E. HAZLETT, OF BRAZIL, INDIANA.

MOTOR-VEHICLE.

1,331,197.  Specification of Letters Patent.  Patented Feb. 17, 1920.

Application filed May 9, 1918. Serial No. 233,592.

*To all whom it may concern:*

Be it known that I, GEORGE E. HAZLETT, a citizen of the United States, and a resident of Brazil, in the county of Clay and State of Indiana, have invented certain new and useful Improvements in Motor-Vehicles, of which the following is a specification.

My invention relates to motor vehicles and particularly to that class in which both axles are employed in the functions of driving and steering the vehicle.

The object of my invention is to provide a vehicle in which the motive power is applied to the four wheels of the vehicle for propelling the same, and both axles are used coöperatively in steering.

With this and other objects which will become apparent as the nature of the invention is more fully described, my invention consists in certain novel features of construction, and combination and arrangements of the parts as herein described and pointed out in the claim.

Referring to the drawings in which like reference characters refer to like parts in the several views:

Figure 1 is a side view, partly in section, of a motor vehicle provided with the driving and steering mechanism of my invention.

Fig. 2 is a plan view of the same, illustrating only the steering mechanism. Fig. 3 is a sectional view showing the construction of the fifth wheel, and Fig. 4 is a view transversely of the frame on line x—x, Fig. 1, and Fig. 5 is a side elevation of the bracket or housing supporting the driving and steering mechanism.

In the drawings the numeral 1 designates the frame of the vehicle which is preferably rectangular and is constructed in the usual manner. On the forward part of the frame is mounted an engine or motor (not shown in the drawings) and extending rearwardly therefrom is an engine shaft 2 suitably journaled in the frame. A rectangular supporting bracket 6 is disposed centrally below and between the side bars of the frame 1 to which it is secured by means of cross bars 61 and brackets 60, said cross bars being securely fastened to said brackets by means of suitable bolts or rivets. The outer end 7 of the engine shaft 2 is journaled in said bracket and has rigidly secured thereto a sprocket 8. Below the outer end of the engine shaft and parallel therewith is a short shaft 9 journaled in the bracket or housing 6, said shaft having secured thereon a sprocket 10. A link belt 11 connects the sprockets described so that power is transmitted from the engine shaft to the shaft 9.

The springs are secured by means of suitable clips to spring plates 63 which are fastened to the opposite side of a fifth wheel. This fifth wheel comprises an inverted U shaped plate 13 having the parallel side walls 14 which surround and inclose a smaller U shaped plate 15. Mounted between the vertical walls 16 of the last named plate are a plurality of rollers 17 on which the upper plate 13 rests and is adapted to rotate. A number of transverse plates 18 secured to the outer edges of the walls 14 prevent the plates from becoming separated from one another.

The lower plate 15 is rigidly secured to the axle 19 at the points 20 and 21 respectively, and supporting brackets 22 are provided in order to afford a more rigid connection between the axle and the fifth-wheel. Such a wheel is provided on both the front and rear axles, said axles being of the type most commonly used in motor truck construction and preferably provided with a gear 23 having meshing therewith a worm gear 24 provided with a stub shaft 25 and the adjacent end of the shaft 9. Between one end of the shaft 25 is disposed a shaft 26 having thereon a sleeve 27, the connections between the same being made by the use of the universal joints 28. The shaft and sleeve are secured together by means of a pin and slot 29 and 30 so that the varying length of said shaft is provided for as the axle is rotated in the steering of the vehicle. It will be seen that a continuous driving connection is maintained at all times between the engine shaft and both vehicle axles.

The guiding mechanism of the vehicle is disposed below the driving parts heretofore described, and consists of a pair of yokes formed of the members 40 which are pivoted at 41 for vertical motion to brackets 42 secured to the outer ends of the axle housings 43 adjacent the supporting wheels. The inner ends of the members 40 are secured together by means of a plate 44 having secured centrally thereof a relatively long collar 45 in which a rod 46 is disposed for limited reciprocation. Centrally of the frame between the inner ends of the yokes, a pair of rods 47 are secured transversely in the rectangular bracket by means of clamp 62, Fig. 5. A pair of collars 48 are slidably mounted on said rods and secured to the former is a broad plate 49 having extended arms 50 which are connected with the rods 46 by means of a ball and socket joint 51. To cause transverse movement of the plate 49 on the rods I secure to the former a cable 52 which passes around the pulleys 53, 54 and 55 journaled in the side bars of the vehicle frame. The cable has its ends connected to a sprocket chain 56 which in turn passes over a sprocket 57 secured on the end of a steering rod 58 journaled on the front end of the frame.

It will be evident from the foregoing description that the operation of the steering shaft will, by means of the connecting sprocket, chain and cable, cause a transverse movement of the plate on the rods which in turn will produce a transverse movement of the inner ends of the yokes, both in the same direction and a corresponding turning of the axles in opposite directions causing the vehicle to be guided in the desired direction.

While I have preferably shown the driving mechanism to consist of a worm gear, a bevel gear and pinion may be used on the axles in which case I provide an opening in the fifth wheel adjacent to the drive shaft. It is also to be understood that suitable brake mechanism is provided for the vehicle but being of the usual type of construction it is not illustrated.

Having thus described my invention, what I claim as new and desire to secure by Letters Patent is:

In a motor vehicle, the combination of a vehicle frame, front and rear axles having supporting wheels mounted thereon, means for pivotally supporting the frame on the axles adjacent their outer ends, driving means for rotating the axles and a guiding mechanism disposed below the driving parts; said guiding mechanism consisting of a pair of yokes secured to the axles adjacent their outer ends, a plate disposed centrally below the vehicle frame and supported by slidable collars upon transverse rods which are rigidly suspended from the main frame of the vehicle and below the driving mechanism, flexible connections between the yokes and the centrally disposed plate, a cable connected to said centrally disposed plate and means attached to the cable for moving the plate and collars attached thereto transversely along the rods on which the collars are carried, which transverse movement causes the axles to swing simultaneously in a horizontal plane in opposite directions.

GEO. E. HAZLETT.